May 12, 1942.  N. L. ETTEN  2,282,953
WRINGER MECHANISM
Original Filed Nov. 11, 1935   7 Sheets-Sheet 1

INVENTOR
Nicholas L. Etten
BY
Jefft & Jefft
ATTORNEYS

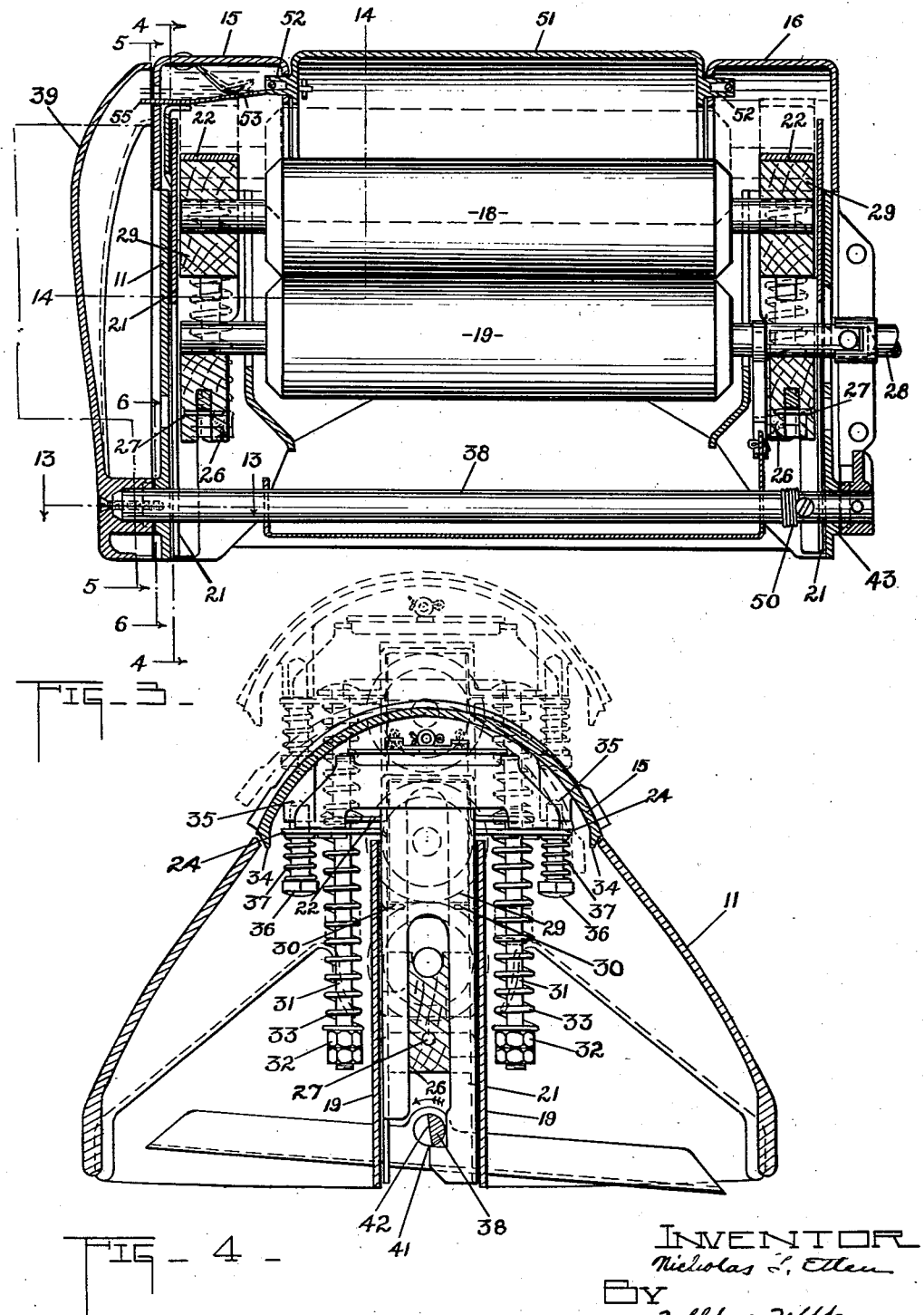

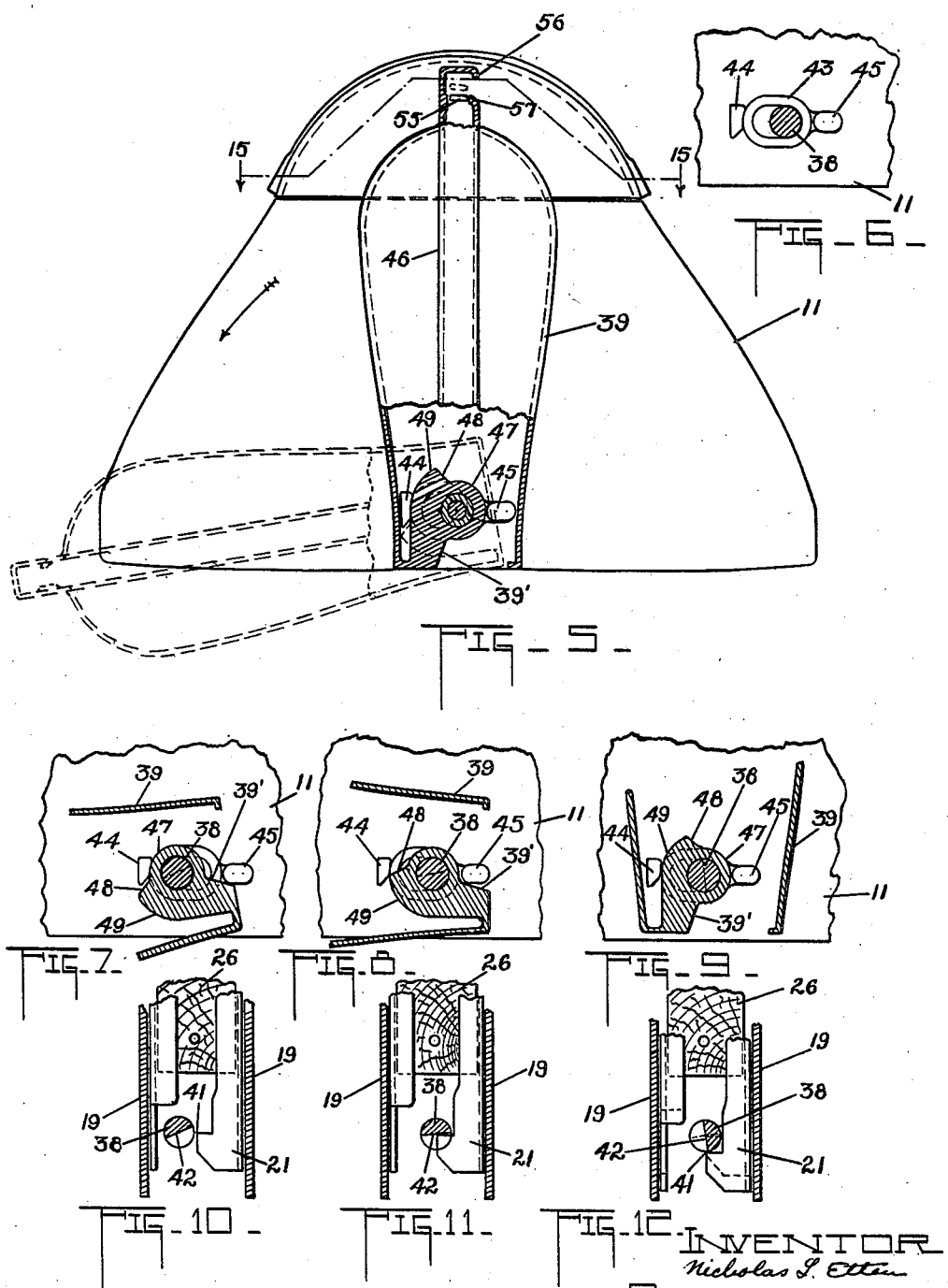

May 12, 1942.   N. L. ETTEN   2,282,953
WRINGER MECHANISM
Original Filed Nov. 11, 1935   7 Sheets-Sheet 4
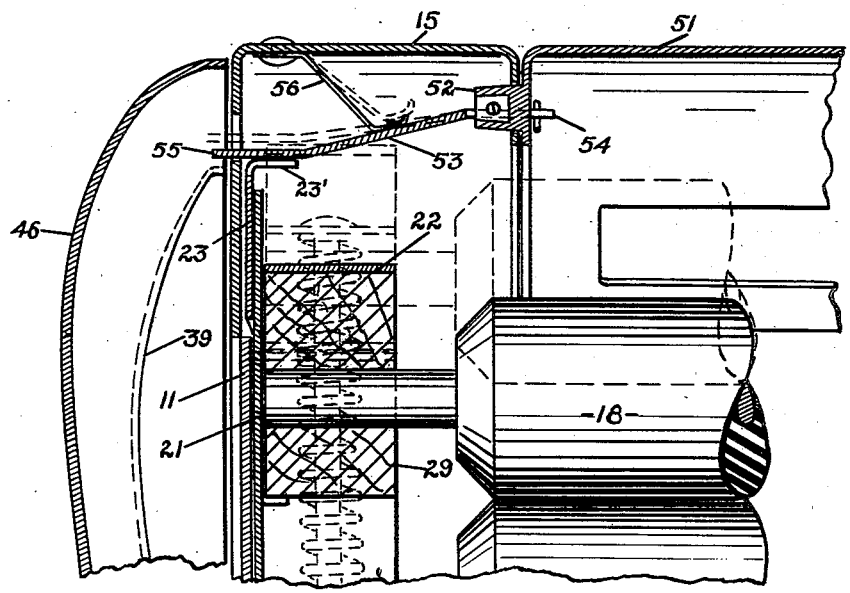
FIG_14_
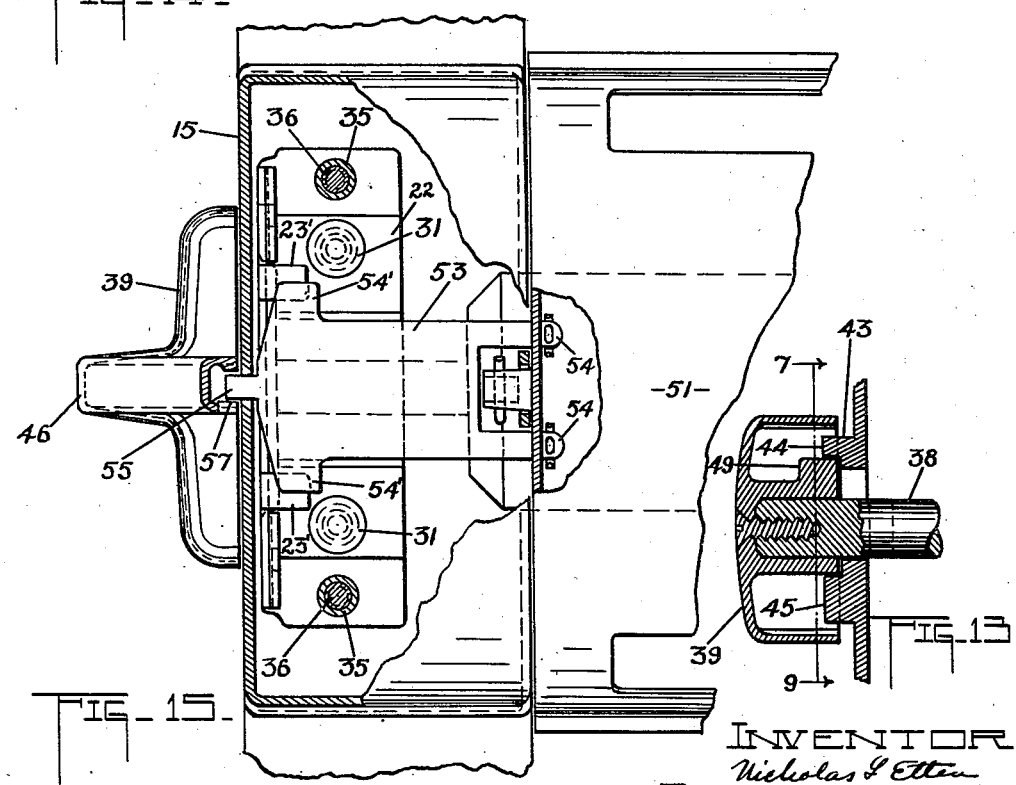
FIG_15_
INVENTOR
Nicholas L Etten
BY
Jefft v Jefft
ATTORNEYS May 12, 1942.    N. L. ETTEN    2,282,953
WRINGER MECHANISM
Original Filed Nov. 11, 1935    7 Sheets-Sheet 5
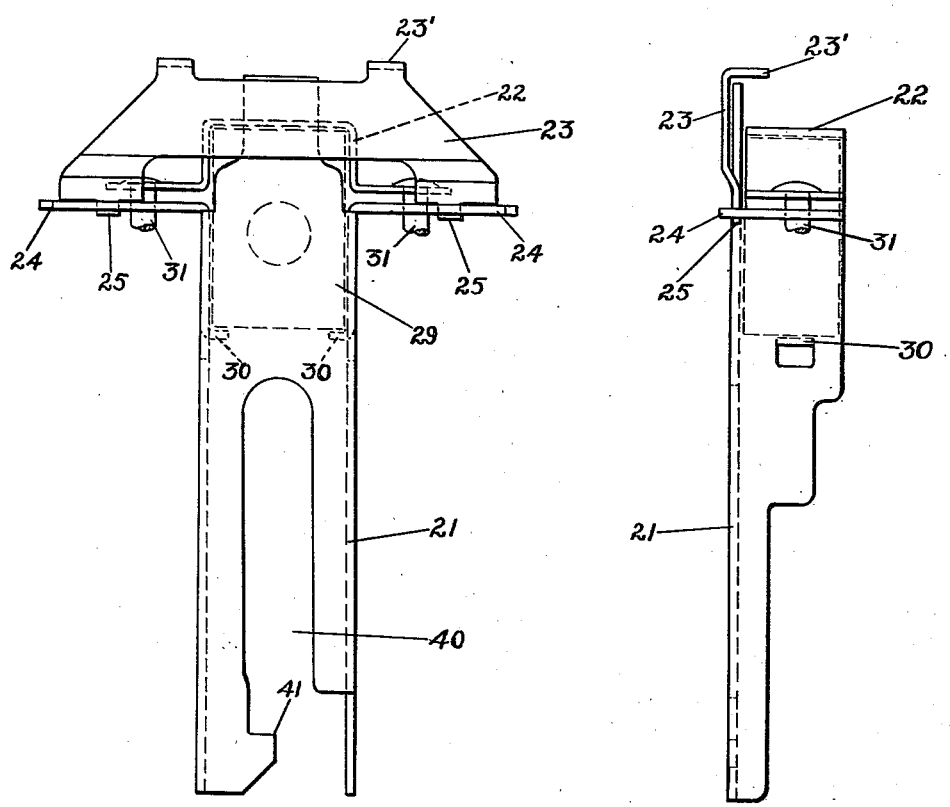
FIG_16_    FIG_17_
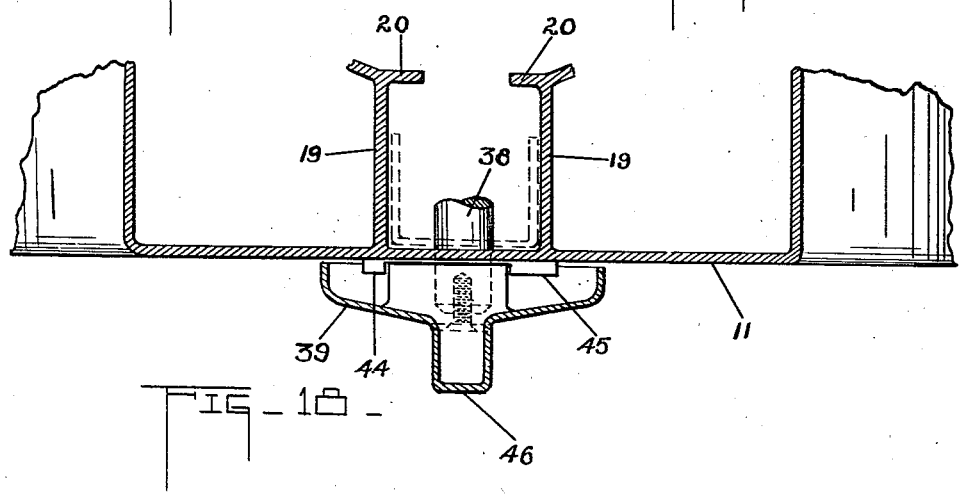
FIG_18_
INVENTOR
Nicholas J Etten
BY
Jefft v Jefft
ATTORNEYS May 12, 1942.                N. L. ETTEN                2,282,953
                           WRINGER MECHANISM
         Original Filed Nov. 11, 1935     7 Sheets-Sheet 6
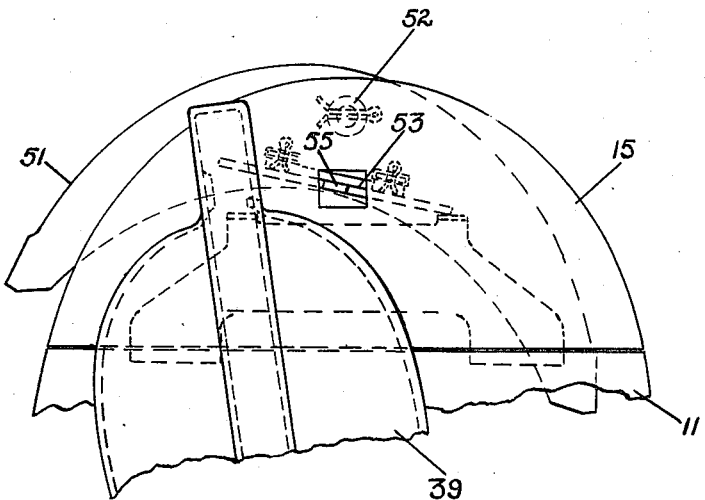
FIG-19-
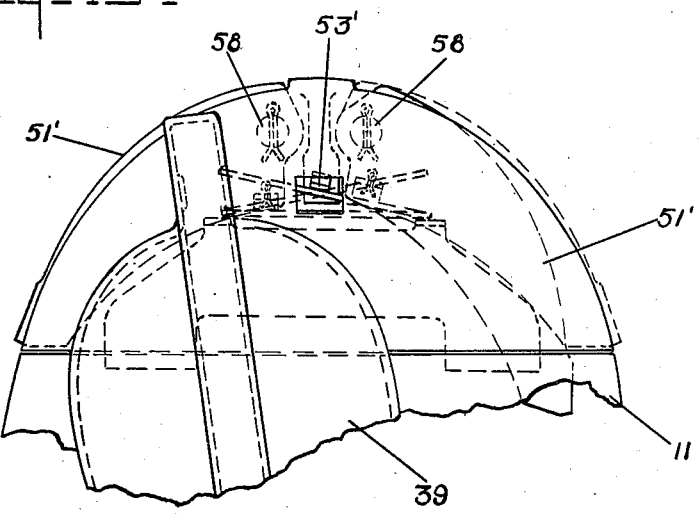
FIG-20-
INVENTOR
Nicholas L. Etten
BY
Jefft & Jefft
ATTORNEYS

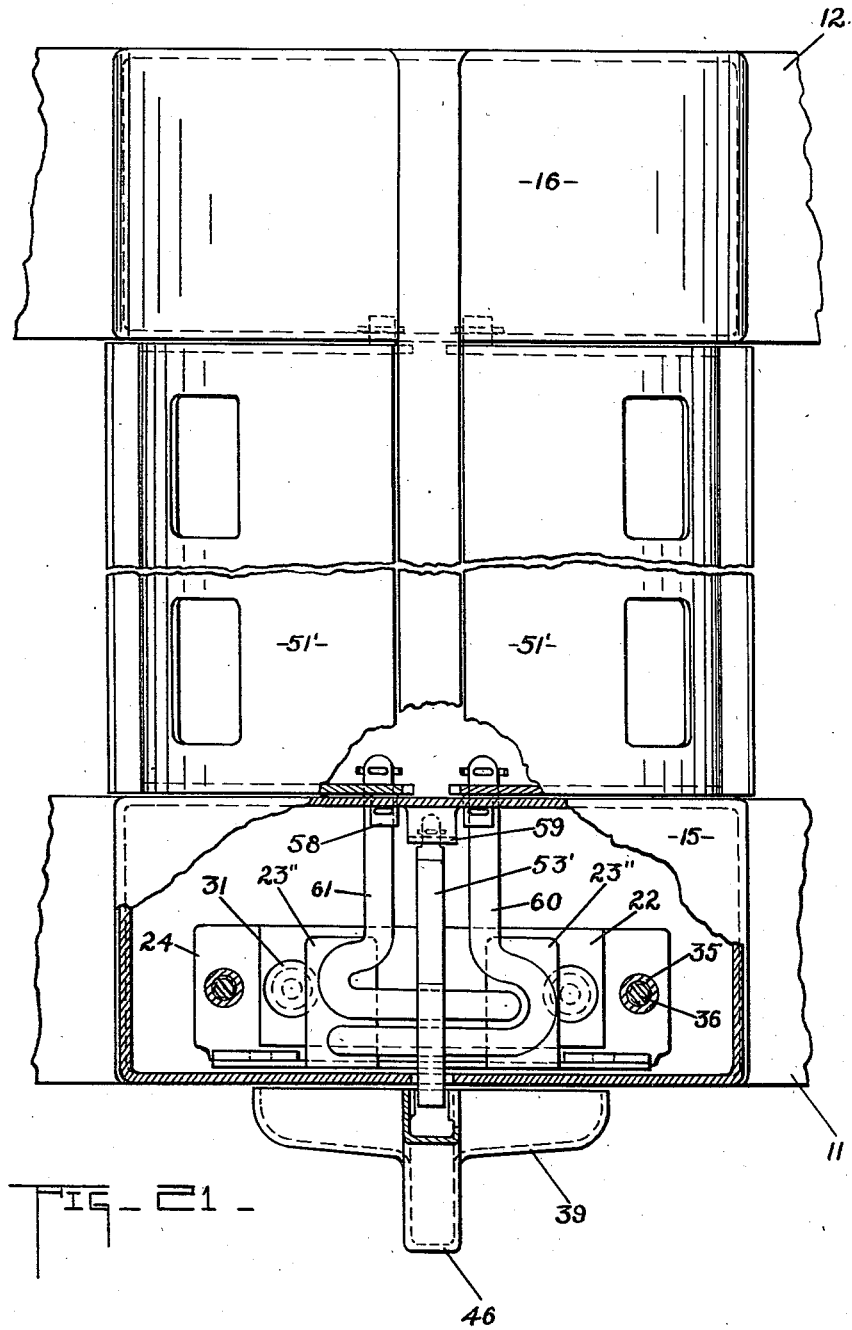

Patented May 12, 1942

2,282,953

UNITED STATES PATENT OFFICE 2,282,953

WRINGER MECHANISM

Nicholas L. Etten, Waterloo, Iowa

Application November 11, 1935, Serial No. 49,122
Renewed July 8, 1940

11 Claims. (Cl. 68—263)

This invention has reference to the wringer art, particularly to a release and reset mechanism for a wringer.

The invention has for one of its objects to provide a wringer mechanism which includes a release mechanism to remove pressure from the rolls and a mechanism operable to reset the released parts so as to re-apply the pressure.

Another object is to provide a mechanism as aforesaid wherein release is accomplished by a simple push or pull movement of a readily accessible element of the wringer.

An additional object is to provide a readily accessible member which may be operated with slight exertion to reset the released parts.

A further object lies in the provision of a release and reset mechanism in which there is a manually accessible member operable to cause the wringer rolls to be pressed together, which member is held in pressure applying position by a latch mechanism controlled by another manually accessible member operable to release the latch whereby the first member is permitted to move out of pressure applying position to remove pressure from the rolls.

A general object is to provide a wringer mechanism which includes easily operated means for establishing pressure relationship between the rolls and simple and readily accessible members for releasing the pressure which members are operated by simple push or pull movement.

Other and additional objects will appear in the following description and accompanying drawings, in which:

Fig. 3 is a side elevational sectional view taken on line 3—3 in Fig. 2;

Fig. 4 is a sectional end elevational view taken on line 4—4 in Fig. 3;

Fig. 5 is an end elevational view, partly in section, taken approximately from line 5—5—5 in Fig. 3;

Fig. 6 is a fragmental elevational view taken from line 6—6 in Fig. 3;

Figs. 7 to 9 are fragmental sectional views taken on line 7—9 in Fig. 13, showing operating details to be described;

Figs. 10 to 12 are fragmental sectional views taken on the lower portion of line 4—4 in Fig. 3;

Fig. 13 is a fractional sectional plan view taken on line 13—13 in Fig. 3;

Fig. 14 is a fragmental sectional side elevational view, the same being an enlargement of the portion included within the line 14—14 in Fig. 3;

Fig. 15 is an enlarged sectional plan view taken on line 15—15 in Fig. 5;

Fig. 16 is an end elevational view showing details of form and assembly of several parts of my mechanism;

Fig. 17 is a side elevational view of the same;

Fig. 18 is a sectional view of frame parts only taken on line 18—18 in Fig. 2;

Fig. 19 is an enlarged fragmental end elevational view showing details of mechanism to be described;

Fig. 20 is an enlarged fragmental end elevational view showing details of mechanism of a modified form of the device to be explained; and Fig. 21 is a broken plan view of the wringer mechanism with portions of the cover broken away, showing in plan the mechanism illustrated in Fig. 20.

Figure 1:
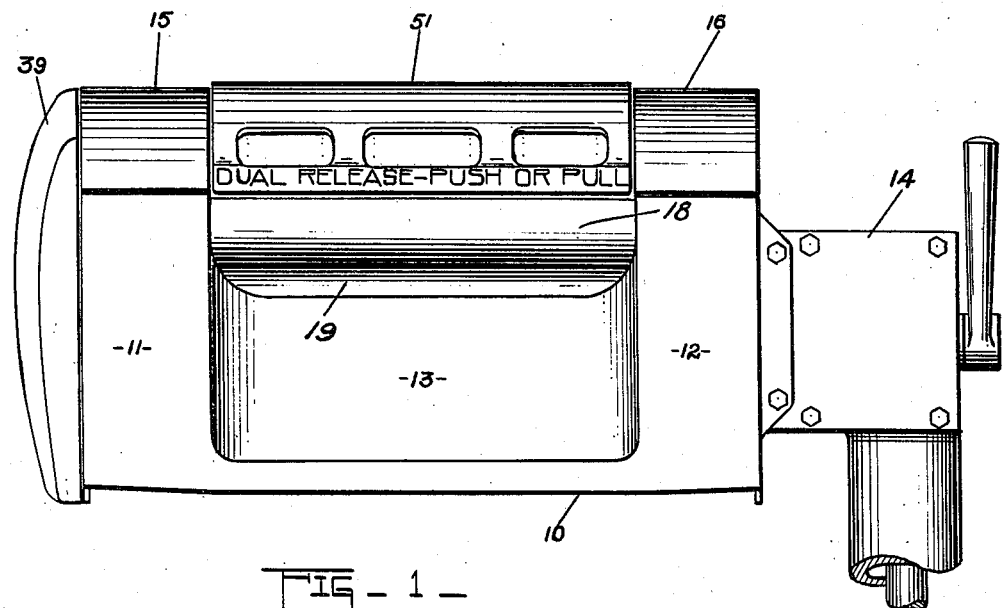
Fig. 1 is a side elevational view of a wringer embodying my invention.

In carrying out my invention I provide a lower frame member 10 which includes end portions 11 and 12 and apron portions 13. The frame is assumed to be attached to a head structure 14 which, not being a part of the present invention, will not be described.

A top structure, which includes end caps 15 and 16 and a centrally disposed release member 51, is separably fitted upon the frame, with cap 15 resting upon portion 11 and cap 16 resting upon portion 12.

A frame and top structure having any desired exterior appearance may obviously be used. I do not wish to be limited in the matter of frame or top arrangement or design.

With slight exception, as will be noted, the frame end portions 11 and 12, and the mechanism associated with each, are alike. In view of this the present description will be principally directed to the structure and mechanism at the left hand end in Fig. 1, it being understood that the mechanism of the right hand end is similar.

Fig. 18 illustrates that the end frame portions are of hollow cross section, with the inner sides open. In the central portion there are two upright walls 19 which are spaced apart and have inturned edges 20, thus forming a vertically disposed channel.

Within this channel there is slidably fitted a frame assembly shown in Figs. 16 and 17. The assembly consists of a main body portion 21 having a channel cross section. Member 21 is disposed in the channel of the end frame member, as indicated in dotted outline in Fig. 18. The assembly further includes a cap member 22, and an extension member 23, attached to outwardly extending portions 24 of member 21 by means of lugs 25 which pass through portions 24, as shown. The assembly will be again referred to.

The shaft of lower roll 19 is journalled in bearing blocks 26, Figs. 3 and 4, which are disposed between walls 19 and held in place by means of pins 27. The lower roll is driven through a connection 28 from a power source not shown.

The upper roll 18 is journalled in bearing blocks 29 which are slidably fitted in the channel of members 21 and disposed as indicated in dotted outline in Figs. 16 and 17. Downward movement of the blocks in member 21 is limited by a pair of inwardly extending lugs 30. Cap members 22 are fashioned to fit over the upper portion of the blocks and the extending end portions of the caps are provided with holes in which are elongated bars 31 having head portions which rest upon the cap structure, as shown.

The bars 31 pass through the portions 24 of member 21 in holes dimensioned so as to permit free movement of the bars therein.

The lower ends of bars 31 are provided with adjustment nuts 32. Coil springs 33 are confined between the nuts and portions 24. The springs obviously react to urge the caps 22 toward members 21, thus urging bearing blocks 29 to slide downwardly into the channel of member 21 toward a position of rest against lugs 30, in which position the bearing blocks, caps, and members 21, become a substantially self contained unitary assembly.

It will be noted in Fig. 4 that the lower edges of end cap 15 rest upon the upper edges of end frame portion 11, there being a suitable rib 34 to hold the cap in register with the frame. The cap is provided with lugs 35 which carry screws 36. The screws pass freely through holes in portions 24. Coil springs 37 are confined between the heads of the screws and portion 24. By means of the fastening just described, end caps 15 and 16 are made a part of the self contained assembly above noted and it will be apparent that the upper roll 18, together with the bearing assemblies and caps 15 and 16, may be bodily removed from the lower frame 11 by a simple upward movement.

With the assemblies positioned in the frame as shown in the several views, roll 18 obviously rests upon roll 19, and when in this position, if member 21 is moved downwardly springs 33 will be compressed, by portions 24, against the nuts 32 whereby the heads of rods 31 are pressed downwardly against caps 22.

Since roll 18 cannot move downwardly in response to the pressure, member 21 moves downwardly away from the bearing blocks 29 which places the full pressure of springs 33 upon the roll. The roll is obviously free to move upwardly, as it normally would when garments are between the rolls, through the resilience of the springs and thus, with members 21 in lowered position the rolls are held in resilient pressure relationship.

To operate the above described pressure mechanism and hold the same in pressure position, I provide a mechanism consisting principally of a shaft 38 journalled in the lower part of frame 11, as will be described, with an arm or handle 39 attached thereto and disposed outside the left hand end of the frame.

As has already been stated, the members 21 are alike in both ends of the wringer frame. They are oppositely arranged so that their back walls lie against the back or outer walls of the end frame portions as best shown in Fig. 3.

Fig. 16 shows a slot 40 cut in the back wall of members 21 and a lip or edge 41 formed in the lower portion of the slot. The lips in opposite members 21 each extend in the same direction with respect to shaft 38 and are so disposed as to be adjacent the shaft.

At the points where the shaft passes through the back walls of members 21 the shaft is milled away through approximately half its diameter so as to leave half circular cross sections opposite the lips 41. The face of one of the cams thus formed is designated 42 in Fig. 4. The cam faces are both cut from the same side of shaft so as to operate in the same relationship upon the lips 41 at each end of the wringer.

At the points where shaft 38 passes through the back wall of end portions 15 and 16 it rests in an elongated opening in which it may both turn and move sidewise. The arrangement is shown in Fig. 6. Bosses 43 are formed in the frame walls to give increased bearing surface and a lug 44 is disposed at one side of each boss. Additional lugs 45 are disposed at the opposite sides of the bossed portions, see Fig. 13.

The arm 39 is of hollow cross section with its inner face open and adapted to lie adjacent the outer face of end frame portion 11. A ribbed portion 46 extends from the bottom of the arm upwardly along the back wall, and beyond the upper end of the arm. The upper end of the rib is fashioned to co-operate with a latch mechanism which will be referred to shortly.

Arm 39 is affixed to shaft 38 and the arm and shaft may be rotated as indicated in Figs. 5 to 12.

Fig. 10 shows the position of cam face 42 when arm 39 is in the position shown in Fig. 7, Fig. 11 corresponds with Fig. 8, and Fig. 12 corresponds with Fig. 9.

That part of arm 39 adjacent shaft 38 is so formed as to provide a cam face which has a low portion 47, a rise 48, and a high portion 49, and the face is so disposed as to contact with lug 44, see Fig. 13.

Fig. 7 illustrates that when arm 39 is in lowered position, the cam portion 47 is engaged with lug 44, shaft 38 lies toward the left in the slot of boss 43 and cam 42 lies nearly horizontal and away from lip 41. An extending portion 39' of the arm engages lug 45 to prevent further lowering rotation of the arm.

Initial upward rotation of the arm places the rise portion 48 in engagement with lug 44 whereby the cam body and shaft 38 are forced to the right and cam 42 is placed in position to engage lip 41.

Rotation of the arm from the Fig. 8 to the Fig. 9 position rotates shaft 38 into the position shown in Fig. 12 whereby lowering movement of member 21 is brought about as is thought clearly apparent.

The action of the roll pressure mechanism as brought about by elevating and lowering movement of member 21 has already been explained and it will now become apparent that the roll pressure mechanism may be operated from pressure to relief position by simple rotation of arm 39 from the solid to dotted line position of Fig. 5 or vice versa.

A spring 50, Fig. 3, is arranged to slightly urge the shaft 38 to rotate counterclockwise as viewed in Fig. 5, and it will be noted in Fig. 12 that cam face 42 lies slightly forward of vertical or dead center position. The arrangement is such that when arm 39 is raised to vertical position and retained in this position member 21 is held in lowered position, but if the arm is released, the pressure of the roll tensioning springs operating on cam 42, together with the tension of spring 50 will instantly initiate and urge continued rotation of the arm and shaft toward and into the release position shown in Figs. 7 and 10.

I have now described the means by which my roll pressure mechanism is operated into pressure or release position. Obviously there must be means for holding the arm 39 in pressure position when the wringer is in use, and a convenient means for disabling this holding means, in order that the roll pressure may be quickly and easily removed when emergencies arise.

Figure 2:
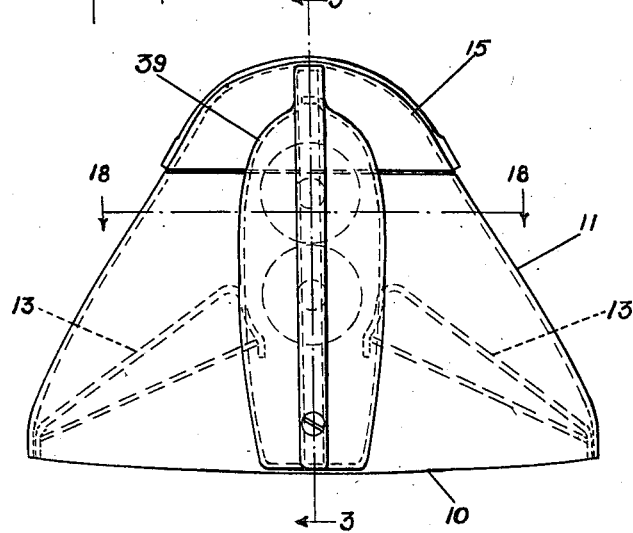
Fig. 2 is an end elevational view of the same.

For the above purpose I provide a mechanism, as follows:

Figs. 1 to 3 show a member 51 which is rockably mounted upon and between end caps 15 and 16 by means of trunnion portions 52 which are rotatably supported in holes in the inner walls of the end caps. In cross section, member 51 has a form similar to the end caps so that when the member 51 lies in inactive position, as in Figs. 1 and 2, the surface lines across caps 15 and 16, and member 51, are substantially continuous.

53, Figs. 14 and 15, designates a plate member which is fashioned so as to have two arms 54 which pass through enlarged openings in the inner wall of end cap 15 and are loosely confined in openings in the end wall of member 51, as shown.

At its opposite end, plate 53 has extending portions 54' which rest upon extending portions 23' of members 23.

A tongue portion 55 of plate 53 extends through the outer wall of cap 15 and lies in the path of the inner face of arm 39. A spring 56 resiliently holds plate 53 in the normal horizontal position shown in Fig. 14.

Referring to Figs. 5 and 15, it will be noted that one side wall of the upper end of rib portion 46 has an opening 56, the lower edge of which is bent inwardly so as to form a cam surface 57, and between the inner edge of this and the opposite wall of portion 46 there is a space large enough to receive the tongue 55 as shown.

It will now become apparent that when arm 39 is rotated into vertical position, corresponding to pressure position on the wringer rolls, the tongue 55 is engaged and elevated by cam 57 and subsequently drops into the space above noted, and the arm is thus locked in pressure position.

It will further be apparent that rocking movement of member 51 in either direction will cause the plate 53 to be tilted away from one or the other of portions 23' whereby the tongue 55 is elevated away from cam 57, as in Fig. 19, to permit escapement of arm 39 with results already described.

A modification of my release actuating mechanism is shown in Figs. 20 and 21. In this arrangement the rocking member 51 is replaced by two separate members 51' disposed on opposite sides of the wringer.

Each member is pivotally mounted at 58 in the end caps 15 and 16, in a manner similar to member 51, and is independently movable as indicated in dotted lines in Fig. 20.

The plate 53 is replaced by a latching member 53' which is pivotally supported at 59 on the inner wall of cap 15.

The extending portions 23' of members 23 are somewhat enlarged and are designated 23''.

To each of the members 51' is attached, in a manner similar to plate 53, an angulated bar, designated 60 and 61. Each bar is fashioned to have a portion lying upon each of portions 23'' and are so dimensioned that each may be operated responsively to movement of its attached member 51' without interference with the opposite bar. A practicable arrangement is shown in Fig. 21.

The latch member 53' overlies both bars and when either of members 51' is tilted or rocked upon centers 58, that is, pushed or pulled out of its normal alignment, its accompanying bar will be tilted and the latch member 53' elevated to release the handle 39 as formerly described.

The exterior form and disposition of members 51 and 51' are alike and they are operated in exactly the same manner to accomplish release of the roll pressure. In both forms the members have outset lower edges so that they are easily grasped and pulled to accomplish release or they may be pushed for the same purpose.

The form, disposition, and operation of the rockable members is such that there is presented to an operator a large, conveniently disposed surface which may be pushed or pulled in an indiscriminate manner to release the roll pressure when occasion arises.

Considering Fig. 12, it will be apparent that when the roll pressure is once set up, the power of the roll springs available to rotate shaft 38 is minute, and the power of spring 50 is only great enough to assist in the initial rotative movement. Obviously the sum of the power of all of the springs, as applied to produce rotation of shaft 38, is not great.

Since the power noted is divided many times by the length of arm 39 it will be clear that the pressure upon the latching members 55 or 53' is slight and therefor the manual effort required to move members 51 or 51' into release position is so small as to be scarcely noticeable to an operator.

Considering the foregoing, it will be obvious that I have provided a wringer release and reset mechanism which may be used by the least experienced operator with the greatest facility and safety.

Modifications of structure of the mechanisms herein described are obviously possible without alteration of the principle disclosed.

I do not wish to be limited in structure or function except within the scope of the appended claims.

What I claim is:

1. A wringer mechanism having in combination, a lower frame including dual upright members on the ends of the frame, a pair of separable top members resting upon each of the upright members, an upper wringer roll mounted in bearings at each end, each bearing being supported by one of said top members of each pair, multiple coil spring pressure mechanism for the roll connected between each of said bearings and a top member of each pair, mechanism operating upon said pressure mechanism to cause downward pressure on said bearings, releasable means holding said operating mechanism from release, and means to release said operating mechanism holding means comprising a manual member pivotally mounted upon and between one of said top members of each pair to rock therebetween upon centers disposed longitudinally of and parallel the axial center of the roll, the same having connection with said holding means whereby rocking movement of said manual member causes release of said holding means.

2. In a wringer, the combination of a frame, rolls mounted in the frame, pressure mechanism for the rolls, means for operating said pressure mechanism including a cam member disposed in the bottom of the frame, a handle manually operating said cam to several positions to move said pressure mechanism into pressure or release positions, a latch mechanism holding said handle in pressure sustaining position and a release mechanism rockably mounted upon the frame for movements relative thereto and being associated with said latch, said latch mechanism being responsive to a rocking movement of said release mechanism, whereby to release said handle.

3. In a wringer the combination of a frame, rolls mounted in the frame, pressure mechanism for the rolls, means for operating the pressure mechanism including a cam member disposed in the bottom of the frame, the cam having operative connection with said pressure mechanism, a handle for manually operating said cam to several positions to move said pressure mechanism into pressure or release positions, a latch mechanism holding said handle in pressure position, an elongated member having a manually engageable surface portion extending from one side of the wringer to the other side thereof and downwardly over the rolls and rockably associated with the frame and operatively associated with said latch mechanism, said member being so mounted and disposed that its said surface portion may be engaged by manual push or pull, whereby to displace said latch mechanism.

4. A wringer mechanism having in combination, a frame, rolls mounted in the frame, pressure mechanism for the rolls disposed in the ends of the frame, means for operating the pressure mechanism including cam members disposed in the bottom of the frame, connection between the cams and pressure mechanisms, a handle for manually operating said cams disposed at one end of the frame, said handle being operative to several positions to operate said pressure mechanisms by means of said cams into pressure or release positions, latching means holding said handle in pressure position, and a manually accessible member operative to disable said latching means whereby to release the roll pressure.

5. A wringer mechanism including in combination, a frame, rolls mounted in the frame, pressure mechanism for the rolls, means for operating the pressure mechanism including a cam member disposed in the bottom of the frame, the cam having operative connection with said pressure mechanism, a handle manually operating said cam to several positions to move said pressure mechanism into pressure or release positions, a latch mechanism holding said handle in pressure position, and members having surfaces extending from the longitudinal central portion of the top of the wringer downwardly and outwardly over and in front of the wringer rolls, which surfaces may be manipulated in a push or pull manner to disable said latch mechanism to release the roll pressure.

6. In a wringer, the combination of a frame, rolls mounted in the frame, pressure mechanism for the rolls, means for operating said pressure mechanism including a cam member disposed in the bottom of the frame, a handle for manually operating said cam to several positions to move said pressure mechanism into pressure or release positions, a latch mechanism holding said handle in pressure sustaining position, and means for effecting the release of said latch from said handle.

7. In a wringer roll mechanism, a lower frame member and substantially vertical side frame members secured to said lower frame member, a pair of members separable from one another and slidably carried by each side frame member, a roll bearing carried by and between each pair of separable members, a spring normally compressed between each pair of said separable members and normally permitting said separable members to separate, means for releasably securing the springs under compression whereby to draw said separable members of each pair together, and means for releasing said spring securing means.

8. In a wringer, a lower frame including upright end portions, rolls mounted in said frame, pressure means for normally holding said rolls in pressure relation with respect to one another, releasable means comprising a notched shaft for normally securing said pressure means and rolls in pressure association, said notch being constructed and arranged to facilitate the resetting of pressure, lever means connected with said releasable means, latch means engageable with said lever means for normally securing said releasing means against operation, means biasing said releasable means to releasing condition, and a manually rockable member disposed between and rockably associated with said upright end portions of the said frame and associated with said latch for releasing said latch means.

9. In a wringer roll release mechanism, substantially vertically extending and laterally spaced frame members, a pair of cooperative wringer rolls disposed between said frame members in substantially a vertical plane, said rolls being relatively movable toward one another, means carried by one of said frame members for sliding movements vertically with respect thereto, a roll bearing member carried by said means in vertically slidable relation thereto and rotatably supporting the upper of said rolls, means for limiting the downward movement of said bearing member relative to said frame carried means, and means for securing said bearing member including a spring on each side of the axis of said bearing member, said springs pressing together said bearing member and said frame carried means whereby compressing of said spring will tend to move said bearing member toward said limiting means.

10. In a wringer, a frame, a pair of cooperative rolls, pressure mechanism for the rolls including a handle shaft with 180° cam notches therein, a quick action cam member on said shaft operable to move the shaft sideways and permit application of pressure by said 180° cam notches in approximately 110° rotation of said shaft, and an operating handle on said shaft, a latch mechanism coacting with said shaft in pressure sustaining position and means for effecting the release of said latch from said shaft when roll pressure is released.

11. In a wringer, a frame, a pair of cooperative rolls, pressure mechanism for the rolls including a handle shaft with cam notches therein, a quick-action cam member on said shaft operable to permit application of pressure by said cam notches in approximately one-third revolution rotation of said shaft, an operating handle on said shaft, a latch mechanism coacting with said shaft in pressure sustaining position and means for effecting the release of said latch from said shaft when roll pressure is released.

NICHOLAS L. ETTEN.